United States Patent [19]

Eckel

[11] 4,292,466
[45] Sep. 29, 1981

[54] CIRCUIT ARRANGEMENT FOR RECEIVING UNIPOLAR DC SIGNALS

[75] Inventor: Giselher Eckel, Mount Laurel, N.J.

[73] Assignee: Siemens Aktiengesellschaft, Berlin and Munich, Fed. Rep. of Germany

[21] Appl. No.: 168,290

[22] Filed: Jul. 11, 1980

[30] Foreign Application Priority Data

Aug. 21, 1979 [DE] Fed. Rep. of Germany ....... 2933847

[51] Int. Cl.³ .......................................... H04M 1/26
[52] U.S. Cl. .................................... 178/3; 179/84 A
[58] Field of Search ............ 178/2 R, 3, 69 R, 69 A, 178/70 R, 70 TS, 17 R, 119; 179/2 DP, 84 R, 84 A, 99, 16 F; 340/365 R; 307/200 B, 260, 270; 235/455

[56] References Cited

U.S. PATENT DOCUMENTS 3,867,567 2/1975 Herron et al. ......................... 178/3
4,142,075 2/1979 Olschewski ...................... 179/16 F

FOREIGN PATENT DOCUMENTS 1427575 3/1976 United Kingdom .

Primary Examiner—Thomas A. Robinson
Attorney, Agent, or Firm—Spellman, Joel & Pelton

[57] ABSTRACT

There is disclosed a circuit arrangement for receiving unipolar DC signals from a transmission line of a telecommunication system. An opto-coupler circuit is coupled with a light-emitting element at the input side to two wires of the receiving branch of the transmission line. A current reflector circuit arranged at the input side of the opto-coupler circuit is composed of a pair of transistors with a common base connection coupled to one wire of the transmission line. One of these transistors is connected in series by its collector-emitter path with the light-emitting element. The second transistor is symmetrically arranged between both wires of the transmission line. A resistor is arranged in the emitter circuit of one transistor for controlling the current reflection ratio.

11 Claims, 3 Drawing Figures

CIRCUIT ARRANGEMENT FOR RECEIVING UNIPOLAR DC SIGNALS

BACKGROUND OF THE INVENTION

The present invention relates to a circuit arrangement for receiving unipolar direct current signals transmitted via a transmission line of a telecommunication system such as a teleprinter system or a data transmission system. In the circuit arrangement there is provided an opto-coupler circuit for non-conductive connection of the receiving branch of the transmission line with an evaluation circuit having adjustable threshold value characteristics for evaluating the incoming DC signals, thereby compensating distortions. The term 'opto-coupler' as used throughout the specification and claims is intended to be synonymous with 'optoelectronic coupler' and/or 'electrooptical isolator', the latter terms being in more prevalent use in the United States.

Upon transmission of DC signals over a transmission line, the incoming signals have to be evaluated or rated at the receiving end of the line to eliminate low-amplitude interference or noise. Such evaluation is achieved by circuit arrangements often having adjustable threshold values. The evaluation takes into account generally differing time constants for leading and trailing edges of transmitted signals and compensates for distortions resulting from variable signal amplitudes. The requirement that the threshold value be adjustable can be achieved by providing an auxiliary reference voltage for setting this value. However, employing an auxiliary voltage gives rise to the problem of additional influences of the transmission line, which influences can be avoided by use of a floating voltage, i.e. an off-ground auxiliary voltage.

Such design of an evaluation circuit arranged at the receiving end of the transmission line results in a relatively large outlay, but this outlay can be reduced by providing opto-coupler circuits to effect a non-conductive connection of the transmission line with receiver equipment including the evaluation circuit. A circuit arrangement of this type has been described in the British Patent Specification No. 1,427,575. This known circuit arrangement for evaluating DC data signals makes use of opto-coupler circuits performing the non-conductive connection and is based upon all the requirements and measures described.

Whereas the known circuit arrangement fulfills to a large extent the requirements to which receiving circuits are subject, in designing such a circuit arrangement the specific characteristics of opto-coupler circuits have to be taken into consideration. Opto-coupler circuits can be used on the premise of sufficiently accurate operating characteristics but this premise cannot be guaranteed in every case. The forward voltage of a light-emitting diode employed as the input stage of an opto-coupler circuit is subject to change in dependence upon the amplitude of the forward current and temperature. Furthermore, an opto-coupler of the transistor-coupler type presents a non-linear transmission factor, i.e. a transmission factor which varies in dependence upon the diode forward current. These properties, which are generally referred to as non-linearities of coupling circuits, lead to distortions and restrict the use of the known circuit.

It is an object of the present invention to provide an improved circuit arrangement for receiving DC signals transmitted via a transmission line.

Another object of the invention is to provide such a circuit arrangement of a design which retains the recently described properties of the receiving circuitry and avoids distortions associated with non-linearities of opto-couplers used as non-conductive transmitting circuits.

SUMMARY OF THE INVENTION

In the present invention the circuit arrangement for receiving unipolar direct current signals from a receiving branch of the transmission line of a telecommunication system and for supplying the DC signals to an evaluation circuit includes an opto-coupler circuit having a light-emitting element associated with an input side and a light-receiving element associated with the output side. The input side of the opto-coupler circuit is coupled to the receiving branch of the transmission line and the output side is connected with the evaluation circuit. A current reflector circuit is arranged at the input side of the opto-coupler and is composed of a first and a second transistor and a resistor. Both transistors form a transistor pair with common base connection. The collector-emitter path of the first transistor is connected in series with the light-emitting element of the opto-coupler circuit. The second transistor is symmetrically arranged in parallel to the series connection of the light-emitting element and the first transistor. The resistor is arranged in the emitter circuit of one transistor and determines the current reflection ratio of the current reflector circuit, i.e. the ratio of the collector-emitter-currents of both transistors.

The advantage of the circuit design according to the present invention, above all, consists in that the current flowing through the light-emitting element of the opto-coupler circuit becomes independent of the forward voltage of the light-emitting element. Furthermore, the current reflection ratio of the current reflector circuit can easily be adjusted by means of the resistor in view of the characteristics of the light-emitting element.

In a preferred improvement of the present invention, there is provided a second current reflector circuit of corresponding design. This second current reflector circuit is arranged with the first current reflector circuit in the form of a cascade such that the second circuit forming an input stage is connected by the emitters of the respective second transistor pair to the common base connection of the first transistor pair. The resistor adjusting the current reflection ratio of the cascade arrangement is provided only in the first current reflector circuit. This cascade arrangement is less sensitive to tolerances of the current amplification of respective transistor pairs used to compose one of the current reflector circuits.

In accordance with a further improvement of the present invention, a second resistor is arranged in the emitter circuit of the second transistor of the first current reflector circuit. Furthermore, there are means for providing feedback from the output side of the opto-coupler circuit to the emitter circuit of the second transistor of the first current reflector circuit. This feedback is dependent upon the transmission factor of the first opto-coupler circuit; accordingly, the current reflection ratio of the current reflector arrangement can be adjusted additionally and specifically corresponding to the transmission characteristics of the opto-coupler circuit. This is especially advantageous for additional adjustment of the current reflection ratio for compensating non-linearities of the transmission characteristics of the opto-coupler circuit.

BRIEF DESCRIPTION OF THE DRAWINGS

A better understanding of the invention may be had by reference to the following description of preferred embodiments in conjunction with the accompanying drawings, in which.

DESCRIPTION OF PREFERRED EMBODIMENTS

Figure 1:
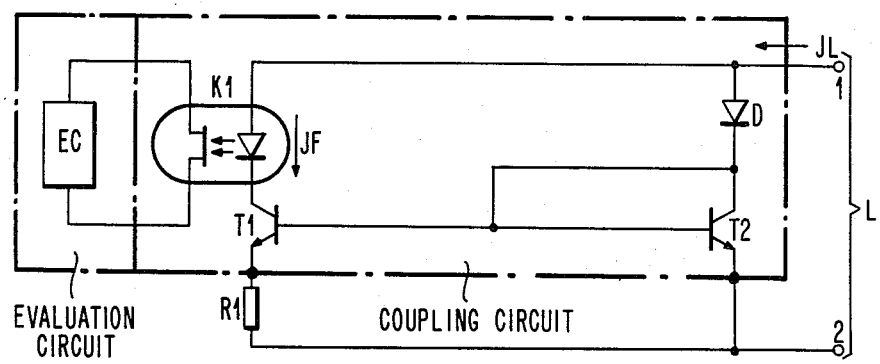
FIG. 1 shows an embodiment of a circuit arrangement for receiving DC signals comprising an opto-coupler circuit connected to the transmission line and a current reflector circuit associated with the input side of the opto-coupler circuit.

A more general embodiment of a circuit arrangement for receiving DC signals, as shown in FIG. 1, is arranged between a transmission line, indicated by the symbol L, and an evaluation circuit EC of conventional type which is part of the receiving circuitry. The transmission line L is connected with two input connectors 1,2 of a coupling circuit which is composed of a first opto-coupler circuit K1. The output side of this opto-coupler circuit is composed of a field-effect transistor (FET) which is coupled to the evaluation circuit EC. In addition, there is provided a so-called current reflector circuit composed of a first and a second transistor T1, T2, having a common base connection forming a control input coupled to the first input connector 1. The emitters of both transistors forming outputs of the circuit are commonly coupled to the second input connector 2. The collector of the first transistor is coupled to the first input connector 1 via the light-emitting diode of the first opto-coupler circuit K1. In this embodiment of a current reflector circuit, a separate diode D is inserted between the first input connector 1 and the collector of the second transistor T2. The collector of the second transistor T2 is commonly connected with both transistor bases thereby providing the same base current in both transistors T1 and T2.

In general, the collectors of transistors T1 and T2 are assigned to two different external circuits such that the externally supplied collector current of the second transistor T2 controls the collector current of the first transistor T1. The ratio of the transistor currents can be selected by circuit design. A ratio of 1 to 1 is often selected. This ratio, which is also referred to as current reflection ratio, in this application is determined by means of a resistor R1 comprising an emitter resistor of the first transistor T1. The equation:

$$IF = IL \times \frac{1}{1 + s} \quad (1)$$

represents the ratio of the line current IL flowing on the transmission line L and the diode current IF flowing through the light-emitting diode of the first opto-coupler circuit K1; the current reflection ratio of the current reflector circuit is designated by s.

Figure 2:
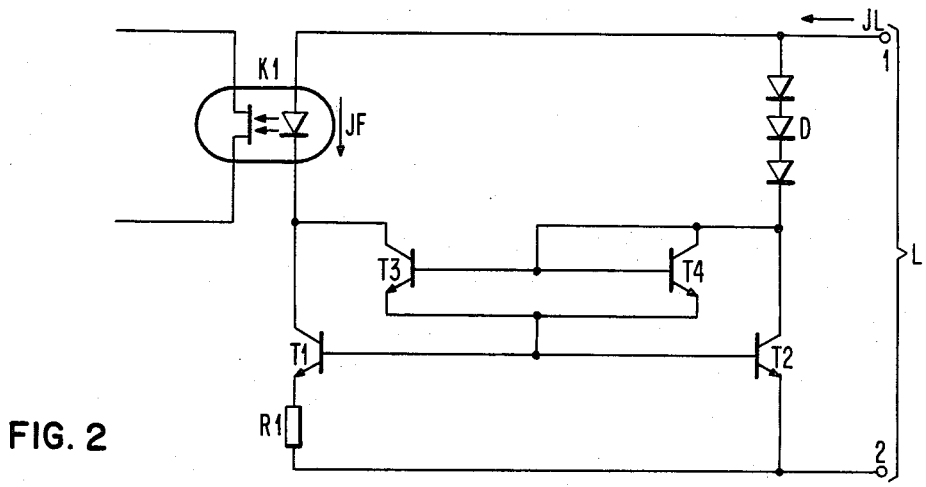
FIG. 2 shows another embodiment of the invention comprising two current reflector circuits connected in a cascade arrangement.
Figure 3:
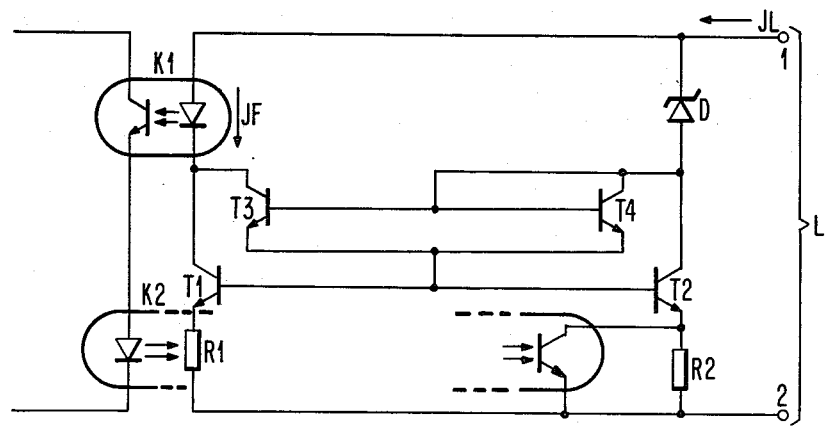
FIG. 3 illustrates still another embodiment of a receiving circuit arrangement with an additional circuit performing feedback from the output of the opto-coupler circuit to the current reflector circuit.

The diode D arranged in the collector circuit of the second transistor T2 insures that an adequate voltage is always available for operating the light-emitting diode of the first opto-coupler circuit K1. If necessary, it is also possible to use either a series arrangement of a plurality of diodes or a Zener diode in place of the single diode D as indicated in FIGS. 2 and 3, respectively. As mentioned, the connection between the base and the collector of the second transistor T2 is to produce identical base current in both transistors T1 and T2. This is obtained as both transistors T1 and T2 are of the same type and are selected to show substantially identical current amplification characteristics. This requirement can easily be met when both transistors T1 and T2 are commonly arranged on a semiconductor substrate in the form of a transistor array.

As indicated, the current reflection ratio s can be changed and thereupon a change of the transistor output currents relative to one another can be achieved by changing the resistor R1 arranged at the emitter side of the first transistor T1. The setting of the resistor R1 and thus the choice of the current reflection ratio s has to be such that the properties of the light-emitting diode of the first opto-coupler circuit K1 are taken into consideration. This design compensates a corresponding non-linearity resulting from the properties of the light-emitting diode of the first opto-coupler circuit K1.

The described mode of operation also applies to the second embodiment of the invention, illustrated in FIG. 2, incorporating the same design principles of the first embodiment described; corresponding elements are designated by the same reference symbols.

In addition to the circuit arrangement described with reference to FIG. 1, there is provided a second current reflector circuit composed of a third and a fourth transistor T3 and T4. The emitters of both transistors are commonly connected with both bases of the first and second transistor T1 and T2. The collector connections and base connections of the third transistor T3 and the fourth transistor T4 correspond to those of the first current reflector circuit comprising the first transistor T1 and the second transistor T2.

The described cascade arrangement of two current reflector circuits is particularly advantageous when transistors of differing current amplification values are used in designing the circuits. The cascade arrangement proves to be largely insensitive to tolerances of current amplification values and consequently the transistor pairs do not have to be closely matched.

The embodiments illustrated in FIG. 1 and FIG. 2 are based upon the assumption that the opto-coupler circuit is designed as an FET coupler, i.e. a field effect transistor forms the output element. This type of opto-coupler circuit has the advantage of a substantially linear relationship between the current flowing through the light-emitting diode and the resistance of the receiving element evaluating the light emitted by the diode. In such a case, controlling of only the diode current is sufficient. With opto-coupler circuits of the transistor type, additionally, the non-linearity of the transmission factor between the input side and the output side of the coupler circuit has to be taken into account.

A still further corresponding embodiment is illustrated in FIG. 3. This circuit arrangement is also composed of two current reflector circuits comprising transistors T1, T2, and T3, T4, respectively. In like manner to the embodiments described above, the current reflection ratio s is adjustable by means of the first resistor R1 arranged as emitter resistor of the first transistor T1. In addition, there is provided a second resistor R2 arranged in the emitter circuit of the second resistor T2 of the first current reflector circuit provided for adjusting the current reflection ratio s.

The design of this circuit arrangement is such that the effective resistance of the second resistor R2 is to be controlled by means providing feed-back from the output of the first opto-coupler circuit K1 to the first current reflector circuit. This can be achieved, as shown in FIG. 3, by a second opto-coupler circuit K2 arranged with its input side in series to the output side of the first opto-coupler circuit K1 and with its output side in parallel to the second resistor R2. This circuit arrangement is designed such that the current reflection of both transistors T1 and T2 of the first current reflector circuit is adjustable for compensating non-linearities of opto-coupler circuits within a wide range.

As mentioned, current reflector circuits may be constructed by using so-called transistor arrays. Furthermore, in accordance with one preferred embodiment of the invention, the current reflector circuit and the opto-coupler circuit can be implemented as an integrated circuit packed into one common housing. In this case, the current reflection ratio s should be adjustable by an external circuit by arranging the resistor R1 or both resistors R1 and R2 outside of the housing as discrete elements which are externally connected with the respective current reflector circuit.

This structure is schematically indicated in FIG. 1 by a dotted line circumventing a coupling circuit which is composed of the opto-coupler circuit and the current reflector circuit. Furthermore, as indicated the evaluation circuit EC of any conventional design also could be part of such an integrated circuit.

As is evident from a comparison of the diagrams of FIG. 1, FIG. 2 and FIG. 3, respectively, the biasing diode D of FIG. 1 may be replaced by several diodes connected in series, as shown in FIG. 2, or even a Zener diode, as shown in FIG. 3.

While the different designs of the circuit arrangement for receiving DC signals transmitted on a transmission line, described above, constitute preferred embodiments of the invention, it is to be understood that the invention is not limited to these specific design details, and that a variety of changes may be made therein without departing from the scope of the invention.

Many changes, modifications, variations and other uses and applications of the subject invention will, however, become apparent to those skilled in the art after considering this specification and the accompanying drawings. All such changes, modifications, variations and other uses and applications which do not depart from the spirit and scope of the invention are deemed to be covered by the invention which is limited only by the claims which follow.

What is claimed is:

1. A circuit arrangement for receiving unipolar direct current signals from a receiving branch of a transmission line of a telecommunication system and for supplying said DC signals to an evaluation circuit having adjustable threshold value characteristics for evaluating said DC signals, said circuit arrangement comprising:
   (a) an opto-coupler circuit having a light-emitting element associated with an input side and a light-receiving element associated with an output side; said input side coupled to the receiving branch of the transmission line and said output side connected with said evaluation circuit; and
   (b) a first current reflector circuit arranged at the input side of said opto-coupler circuit and being composed of both a first and a second transistor, forming a transistor pair with a common base connection, as well as a resistor;
      (b1) said first transistor being connected by its collector-emitter-path in series with said light-emitting element;
      (b2) said second transistor being symmetrically arranged in parallel to the series connection of said light-emitting element and said first transistor; and
      (b3) said resistor being arranged in the emitter circuit of one of said transistors for controlling a current reflection ratio of said current reflector circuit.

2. The circuit arrangement of claim 1, wherein both transistors of said current reflector circuit are commonly arranged on one semiconductor substrate and in the form of a transistor array.

3. The circuit arrangement of claim 1 further comprising a biasing diode connected in parallel with said light-emitting element of said opto-coupler circuit and inserted between said transmission line and the common base connection of both transistors of said current reflector circuit.

4. The circuit arrangement of claim 3, comprising further diodes arranged in series with said biasing diode.

5. The circuit arrangement of claim 3, wherein said biasing diode is composed of a Zener diode.

6. The circuit arrangement of claim 1, further comprising a second current reflector circuit of corresponding design and connected with the first current reflector circuit in a cascade arrangement such that the second current reflector circuit forms an input stage and said resistor adjusting the current reflection ratio is provided only in the first current reflector circuit.

7. The circuit arrangement of claim 6, wherein the second current reflector circuit further comprises:
   a third and a fourth transistor arranged in parallel forming a common base connection and a common emitter connection, the collectors of said third and fourth transistor each connected with a respective collector of the first and the second transistor, said common base connection of said third and fourth transistor connected with said biasing diode, and the common emitter connection of said third and fourth transistors commonly connected with the bases of said first and second transistors.

8. The circuit arrangement as recited in claim 7, further comprising:
   (a) a second resistor arranged in the emitter circuit of said second transistor of the current reflector circuit; and
   (b) means for providing feedback from the output side of said first opto-coupler circuit to the emitter circuit of said second transistor dependent on the transmission factor of said first opto-coupler circuit.

9. The circuit arrangement as recited in claim 8, wherein the means for providing feedback further comprises a second opto-coupler circuit having a second light-emitting element and a second light-receiving element and arranged in parallel in opposed relationship to said first opto-coupler circuit; said second light-receiving element of said second opto-coupler circuit being connected in parallel with said second resistor.

10. The circuit arrangement as recited in claim 9, wherein both opto-coupler circuits are commonly arranged in one housing in the form of an optical coupler array.

11. The circuit arrangement as recited in claim 9, wherein both opto-coupler circuits and both current reflector circuits are arranged in one housing, whereby said first and second resistors, which serve to determine the current reflection ratio, and comprise discrete elements, are arranged outside the housing.

* * * * *